Figure 2:
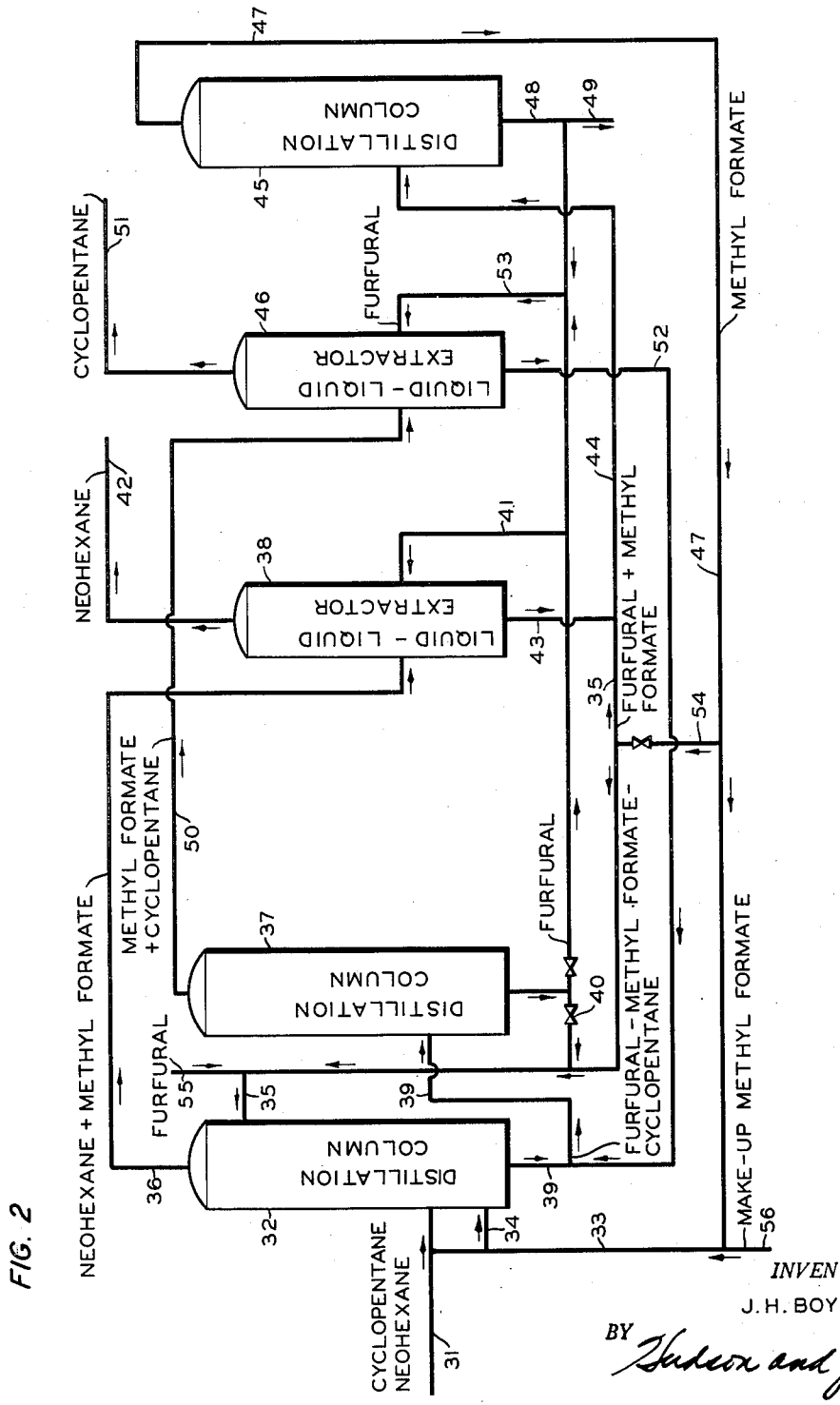

INVENTOR.
J. H. BOYD
BY Hudson and Young
ATTORNEYS

Patented Sept. 2, 1952

2,609,333

UNITED STATES PATENT OFFICE 2,609,333

AZEO-EXTRACTIVE DISTILLATION

James H. Boyd, New York, N. Y., assignor to Phillips Petroleum Company, a corporation of Delaware Application July 30, 1948, Serial No. 41,454

6 Claims. (Cl. 202—39.5)

This invention relates generally to the separation of difficultly separable hydrocarbons. In one aspect this invention relates to the separation of close-boiling aliphatic hydrocarbons and alicyclic hydrocarbon by distillation. In a more particular aspect this invention relates to the separation of close-boiling isoparaffinic hydrocarbons and naphthenic hydrocarbons by distillation. This invention is particularly useful for the separation of neohexane and cyclopentane by distilling a mixture of these hydrocarbons in the presence of an azeotrope-forming solvent and an extractive distillation solvent.

Azeotropic and extractive distillations for the separation of close-boiling hydrocarbons, not separable by conventional distillation procedures, are commercial operations of importance. Both methods of distillation have the property in common that a substance, not present in the mixture to be separated, is added to increase the difference in volatility of the difficultly separable components of the mixture. Azeotropic distillation may be defined as a process in which the substance added forms an azeotrope with one or more of the components and by virtue of this fact is present on most of the plates of the distillation or fractionation column in appreciable concentration. Extractive distillation may be defined as a distillation in the presence of a substance that is relatively non-volatile compared to the components to be separated and which, therefore, is charged continuously near the top of the distilling or fractionating column so that an appreciable concentration of solvent is maintained on all the plates of the column.

The separation of close-boiling hydrocarbon mixtures by azeotropic distillation depends upon the addition to the hydrocarbon mixture of a material, sometimes loosely referred to as a solvent, that forms a minimum boiling point azeotrope with one of the hydrocarbons in the mixture; some of the solvent is maintained in the fractionator bottom at least until all of the hydrocarbon that forms the azeotrope with the solvent has been removed from the system. The effect of formation of the azeotrope is to increase significantly the volatility of the hydrocarbon contained in the azeotrope relative to the volatilities of the other hydrocarbons in the mixture, thus permitting separations that cannot be made by using the ordinary or normal volatilities of the hydrocarbons. The following are examples of azeotropic-formers or entrainers that are used to separate difficultly separable hydrocarbons: methyl formate (boiling point 31.5° C.), methanol (boiling point 64.5° C.), acetone (boiling point 56.5° C.), ethanol (boiling point 78° C.), methyl cyanide (boiling point 82° C.), acetic acid (boiling point 118° C.), ethylene glycol monomethyl ether (boiling point 125° C.).

In extractive distillation a relatively high-boiling polar solvent is added to the fractionating or distillation column near the top, and in descending it scrubs the ascending vapors. This solvent, if properly selected, depresses the normal volatility of one of the hydrocarbons in the mixture more than the volatilities of the other hydrocarbons in the mixture, thus providing an abnormally great difference in the effective volatilities and thus facilitating separation by distillation. This derangement of the normal volatilities of the hydrocarbons permits the separation of hydrocarbon mixtures which are normally inseparable by straight fractionation. The use of furfural in the separation of normal butane from butenes and in the separation of butene-1 from butadiene, butene-2 and vinyl acetylene is now practiced in industrial operations. Solvents useful in extractive distillations are generally polar and less volatile than the least volatile hydrocarbon in the mixture to be separated. Such solvents include furfural (boiling point 161° C.), phenol (boiling point 183° C.), benzonitrile (boiling point 191° C.), nitrobenzene (boiling point 210° C.), dimethyl formamide (boiling point 153° C.), and methyl levulinate (boiling point 196° C.).

Thus the azeotropic separation of hydrocarbons in difficultly separable hydrocarbon mixture depends on increasing the relative volatility of one or more of the hydrocarbons to be separated by addition of the azeotrope forming solvent to the distillation system. Hydrocarbon separation by extractive distillation depends upon the lowering of the volatility of one or more of the hydrocarbons in the mixture by the addition of a relatively non-volatile polar solvent to the distillation system.

In spite of the phenomenon known as azeotropic distillation, there are instances where such distillation of petroleum fractions is not as effective as desired, and considerable recycling is necessary, either internally in the column by the use of very high refluxes or externally by repetition of distillation of the partially separated products. The separation of cyclopentane (boiling point 49.26° C.) and neohexane (boiling point 49.75° C.) is difficult even when using methyl formate as an entrainer or azeotrope-former for preferential removal of the neohexane from the hydrocarbon mixture. A similar mixture difficult to separate is 2,4 dimethyl pentane (boiling point 80.51° C.) and 2,2 dimethyl pentane (boiling point 79.2° C.) from cyclohexane (boiling point 80.74° C.). Methanol forms an azeotrope with the isoheptanes thus affording a means of separating them from the cyclohexane, but the separation is difficult to perform.

It is an object of this invention to provide an improved method for the resolution of a mixture of close-boiling hydrocarbons. Another object of this invention is to provide an improved method for the resolution of a mixture of close-boiling hydrocarbons by combining the two processes of azeotropic and extractive distillation into one distillation process. It is a further object of this invention to resolve a mixture of close-boiling aliphatic and alicyclic hydrocarbons by distilling the mixture in the presence of an azeotrope-forming solvent and of an extractive solvent. A further object of this invention is to resolve a mixture of neohexane and cyclopentane by distilling the mixture in the presence of methyl formate and furfural. Still another object of this invention is to resolve a mixture of isoheptane and cyclohexane by distilling the mixture in the presence of methanol and nitrobenzene. Further and additional objects will be apparent from my disclosure.

I have found that mixtures of close-boiling hydrocarbons, that can not be readily separated by ordinary distillation procedures, can be resolved by a distillation process which is a combination of azeotropic and extractive distillation. In accordance with my invention I effect the distillation of mixtures of difficultly separable hydrocarbons in the presence of a solvent that forms an azeotrope with at least one of the hydrocarbon components of the mixture and in the presence of an extractive solvent that depresses the volatility of at least one of the other hydrocarbon components of the mixture. By proper selection of an azeotrope-forming solvent and of an extractive distillation solvent the difference between the relative volatilities of the one or more hydrocarbons in the overhead effluent from the distillation and of the one or more hydrocarbons being withdrawn as the bottoms product from the distillation can be heightened by the opposite effects of the two solvents on the relative volatilities of the hydrocarbons in the system. This kind of distillation may be termed azeo-extractive distillation.

Broadly, my invention contemplates the separation of close-boiling hydrocarbons by azeo-extractive distillation. In one of its aspects my invention contemplates the separation of close-boiling aliphatic and alicyclic hydrocarbons by azeo-extractive distillation. My invention is particularly valuable for the separation of mixtures of neohexane and cyclopentane, and of at least one of the isoheptanes and cyclohexane, by azeo-extractive distillation, but it will be obvious to one skilled in the art that numerous other difficultly separable hydrocarbon mixtures may be separated readily by employing my invention.

In selecting the solvents, which may be either miscible or immiscible in each other, for use in separating the components of a given close-boiling hydrocarbon fraction, the more volatile solvent added must form an azeotrope with at least one of the hydrocarbon components of the mixture to be separated. It also should boil well below the higher boiling solvent added and here a temperature interval between the normal boiling points of 20–40° C. is desirable. It is also desirable that the azeotrope-forming solvent shall be water soluble or not completely miscible with the hydrocarbon in the azeotrope at temperatures 20° C. below the temperature of condensation of the azeotrope. This is to facilitate separation of the azeotropic solvent from the hydrocarbon removed in the azeotrope. These properties are desirable in said solvent. The heavier solvent shall be higher-boiling than the highest boiling hydrocarbon in the mixture. Ordinarily the heavy solvent will be separated from the hydrocarbon-solvent mixture withdrawn as bottoms from the distillation apparatus by a second distillation step though selective solvent extraction or fractional crystallization can be employed when the properties of the hydrocarbons and the solvent selected make either process advantageous.

Figure 1:
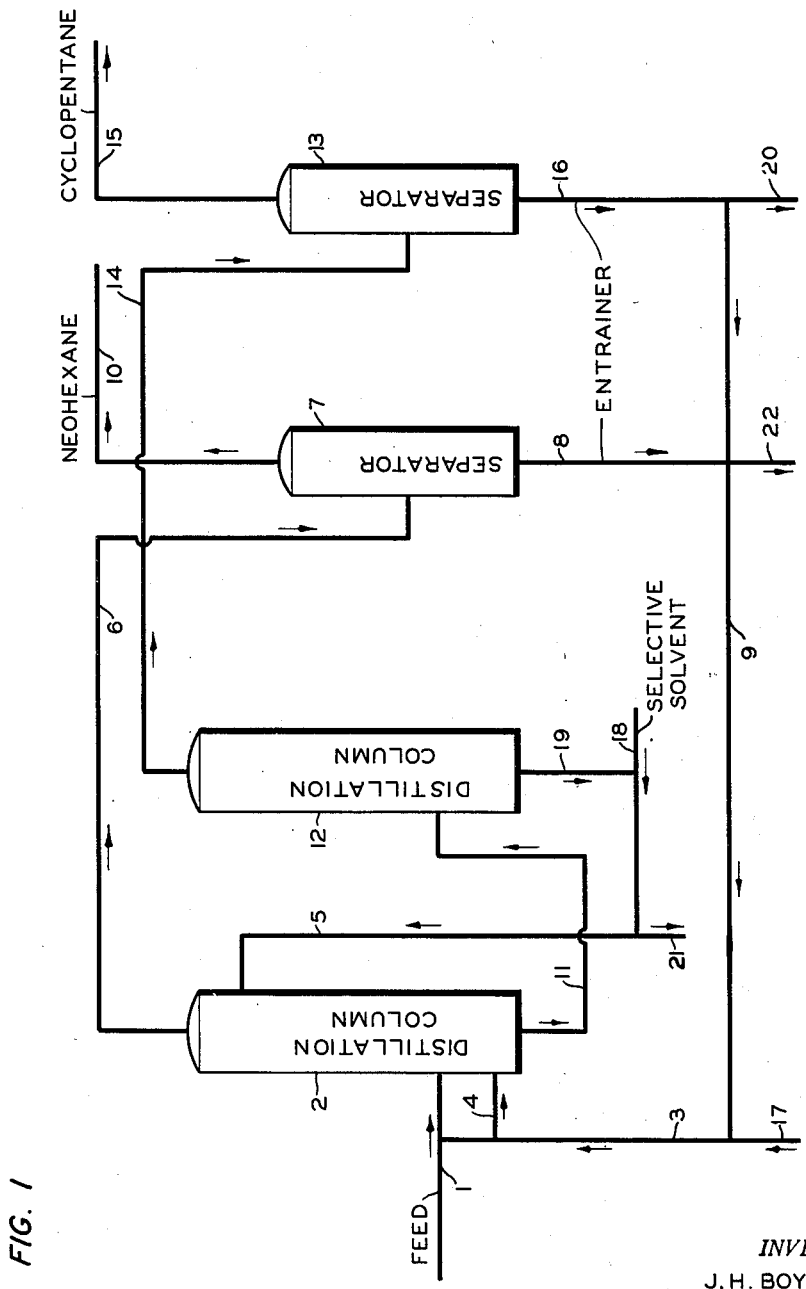

The diagrammatic drawings represent merely preferred embodiments of my invention, but they are useful for completely understanding my invention. Figure 1 is a flow diagram for practicing my invention to separate a hydrocarbon mixture containing about 10 per cent neohexane and about 90 per cent cyclopentane using an azeotrope former or entrainer and an extractive solvent which are immiscible in each other. The hydrocarbon mixture is introduced via line 1 into distillation column 2 which is a column of conventional design, such as a packed or bubble-cap column, wherein rectification occurs. The azeotrope-forming solvent or entrainer for the neohexane is introduced to the distillation column either via line 3 with the hydrocarbon mixture or separately via line 4 or both. The selective solvent for depressing the volatility of the cyclopentane is introduced to the fractionating column at or near the top via line 5 in order that it can scrub the ascending vapors. The overhead product from column 2 comprising neohexane and entrainer passes via line 6 to separator 7 where the entrainer is separated from the neohexane by any suitable means such as washing with water or other solvent, phase separation, etc. Substantially pure neohexane is withdrawn from separator 7 via line 10, and the entrainer from separator 7 is returned to column 2 via lines 8, 9 and 3. The bottoms product from column 2 comprising cyclopentane, selective solvent, and, possibly a small amount of entrainer passes via line 11 to distillation column 12. After distillation the overhead product from column 12 containing cyclopentane and the small amount of entrainer passes via line 14 to separator 13. Substantially pure cyclopentane is withdrawn via line 15, and the entrainer is returned to column 2 via lines 16, 9 and 3, the bottoms product from column 12 which is substantially pure selective solvent is returned to column 2 via lines 19 and 5. Fresh entrainer and selective solvent are introduced to the system via lines 17 and 18 respectively.

Alternatively, column 2 may be operated so that substantially all of the entrainer is taken overhead with the neohexane. In that event there will be very little, if any, entrainer in lines 14 and 16 and the system can be operated without separator 13. Then, column 12 would be replaced by any suitable means for separating the selective solvent from the cyclopentane, and substantially pure cyclopentane would be obtained in line 14, and the selective solvent would be returned to column 2 via lines 19 and 5.

Lines 20 and 22 are placed in the system for the removal of entrainer from the system, and line 21 is similarly provided for the removal of selective solvent. Either the entrainer or selective solvent or both may become contaminated by impurities such as polymeric materials, decomposition products or the like, and it will become necessary to remove the entrainer and/or selective solvent from the system via the lines provided therefor and to separate the contaminants in purification means not shown to prevent the accumulation of these undesirable materials in the system.

Another embodiment of my invention is shown by Figure 2 wherein a hydrocarbon mixture of neohexane and cyclopentane is separated by azo-extractive distillation using two miscible solvents, such as methyl formate, as the azeotrope-former or entrainer, and furfural, as the selective solvent. In this embodiment the miscibility of the entrainer and selective solvent is sufficiently high that the selective solvent can extract the entrainer from any of the hydrocarbons in the mixture to be separated. In accordance with my invention, a hydrocarbon mixture of cyclopentane and neohexane is introduced via line 31 to fractionation or distillation column 32 which may be similar to column 2 in Figure 1. The methyl formate enters column 32 via line 33, and, if desired, additional methyl formate is added to the lower portion of the column via line 34. Furfural, the selective solvent, saturated or nearly saturated with methyl formate is introduced to column 32 at or near the top tray via line 35. The overhead product from column 32 containing an azeotrope of neohexane and methyl formate passes via line 36 to liquid-liquid extractor 38 for the removal of the methyl formate. The bottoms product from column 32 containing cyclopentane, furfural and methyl formate passes via line 39 to fractional distillation column 37 where the cyclopentane and methyl formate are separated by distillation from the furfural, one portion of which is returned to column 32 via lines 40 and 35 and another portion of which passes to extractor 46 via lines 57, and 53. Extractor 38 is any suitable device for liquid-liquid contacting which may be used to extract methyl formate from neohexane with furfural. Substantially pure neohexane is withdrawn via line 42, and methyl formate dissolved in furfural is withdrawn from 38 via line 43. A portion of this solution is returned to column 32 via line 35, and the remainder is passed via line 44 to distillation column 45 where the methyl formate is separated from the furfural. The methyl formate is the overhead product from column 45 and it is returned via lines 47, 33 and 31 and/or 34 to column 32. The furfural is the bottoms product from column 45, and it passes via lines 48 and 53 to extractor 46. If desired a portion of the furfural may be withdrawn via line 49 for purification (not shown). Extractor 46 is similar to 38, and it is used to effect liquid-liquid contact of furfural, introduced via line 53, with the mixture of methyl formate and cyclopentane, the overhead product from column 37. A cyclopentane-rich phase is withdrawn from 46 via line 51, and the furfural phase, containing dissolved methyl formate and cyclopentane, passes via lines 52 and 39 to column 37 along with the bottoms product from column 32. A portion of the methyl formate in line 47 may be passed via line 54 to line 35 to increase the methyl formate content of the furfural stream entering column 32. Fresh furfural and methyl formate are added via line 55 and 56 respectively, as required.

The specific conditions, such as temperature and pressure, that are employed in practicing my invention are dependent upon the hydrocarbons to be separated and upon the entrainer and selective solvent that are used. For most separations, the fractionating columns will be operated at approximately atmospheric pressure, but higher and lower pressures may be used. For example, in some separation systems it is necessary to employ vacuum distillation procedures in order to prevent excessive decomposition of the selective solvent.

Referring to the system described in Figure 2, when operating at atmospheric pressure, the overhead temperature in column 32 is about 30° C. and the kettle temperature varies from 35 to 45° C. depending upon the proportion of furfural in the kettle product. The kettle temperature in columns 37 and 45 is 162° C., the boiling point of furfural, and the overhead temperature of column 37 is between 26 and 49.3° C., the boiling points of the cyclopentane-methyl formate azeotrope and of cyclopentane respectively. The overhead temperature of column 45 is 32° C. the boiling point of methyl formate.

Referring to Figure 1 wherein the entrainer and selective solvent are immiscible, the overhead temperature of column 2 is approximately the boiling point of the azeotrope of neohexane and the entrainer, and the kettle temperature is between 49.3° C., the boiling point of cyclopentane, and the boiling point of the selective solvent. The overhead temperature of column 12 is about 49.3° C., and the kettle temperature is about the boiling point of the selective solvent.

The advantages of practicing my invention are quite readily apparent from the present disclosure. By combining the opposite effects of azeotropic and extractive distillation in a single separation step it is possible to effect a given separation with fewer theoretical plates than when using either method of distillation alone. Also, I have found that by combining azeotropic and extractive distillation a more complete separation of hydrocarbons is obtained than when only one of the methods of distillation is used. This fact is substantiated by the following examples.

*Example I*

300 cc. of a mixture comprising approximately 50 volume per cent each of neohexane and cyclopentane was charged to the kettle of a 60 plate fractionating column together with an equal volume of methyl formate and 200 cc. of furfural. The column was operated at a reflux ratio of 15:1, and furfural was introduced at a point just below the overhead take-off line at a rate of about 50 cc. per hour. The overhead product, which contained about 61 volume per cent neohexane and 39 volume per cent methyl formate, was substantially free of cyclopentane.

*Example II*

The column employed in Example I was charged with 188 cc. of a 50-50 mixture of neohexane and cyclopentane, and 225 cc. of methyl formate. Reflux was established and maintained for 3 hours. The column was again operated at a reflux ratio of 15:1, but without the addition of furfural. The overhead product contained 58 per cent methyl formate and 42 per cent hydrocarbon by volume. The hydrocarbon, free of methyl formate, was found to consist of 66 volume per cent neohexane and 34 per cent cyclopentane.

From the above disclosure numerous variations

I claim:

1. The method of resolving a hydrocarbon mixture comprising cyclopentone and neohexane which comprises distilling said mixture in the presence of methyl formate to form an azeotrope with said neohexane and in the presence of furfural to depress the volatility of said cyclopentane; recovering a mixture of methyl formate and neohexane substantially free from cyclopentane as the overhead product of said distillation; separating the mixture of methyl formate and neohexane so as to recover neohexane by contacting the mixture with furfural; and recovering furfural and cyclopentane as the kettle product of said distillation.

2. The method of resolving a hydrocarbon mixture comprising cyclopentane and neohexane which comprises distilling said mixture in the presence of methyl formate to form an azeotrope with said neohexane and in the presence of furfural to depress the volatility of said cyclopentane; recovering a mixture of methyl formate and neohexane substantially free from cyclopentane as the overhead product of said distillation; separating the mixture of methyl formate and neohexane so as to recover neohexane by contacting the mixture with furfural; recovering furfural and cyclopentane as the kettle product of said distillation; and separating said kettle product into its components by separately distilling the same so as to recover cyclopentane as an overhead fraction and furfural as a bottoms fraction.

3. The method of resolving a hydrocarbon mixture comprising cyclopentane and neohexane which comprises distilling said mixture in the presence of methyl formate to form an azeotrope with said neohexane and in the presence of furfural to depress the volatility of said cyclopentane; recovering a mixture of methyl formate and neohexane substantially free from cyclopentane as the overhead product of said distillation; recovering a kettle product comprising cyclopentane, furfural, and methyl formate; distilling said kettle product so as to recover an overhead fraction comprising principally methyl formate and cyclopentane; and contacting said last-named overhead fraction with liquid furfural so as to recover cyclopentane.

4. The method of resolving a hydrocarbon mixture comprising cyclopentane and neohexane which comprises distilling said mixture in the presence of methyl formate which is introduced to the distillation column near the bottom of said column and in the presence of furfural which is substantially saturated with methyl formate and which is introduced to the distillation column near the top of said column; withdrawing as the overhead product of said distillation a mixture comprising neohexane and methyl formate substantially free from cyclopentane; separating said overhead product into its components by contacting same with furfural and recovering substantially pure neohexane; withdrawing as the bottoms product from said distillation a mixture comprising furfural, methyl formate, and cyclopentane; separating said bottoms product into its components; and recovering a cyclopentane-rich phase.

5. The method of resolving a hydrocarbon mixture comprising cyclopentane and neohexane which comprises distilling said mixture in the presence of methyl formate which is introduced to the distillation column near the bottom of said column and in the presence of furfural which is substantially saturated with methyl formate and which is introduced to the distillation column near the top of said column; withdrawing as the overhead product of said distillation a mixture comprising neohexane and methyl formate substantially free from cyclopentane; withdrawing as the bottoms product from said distillation a mixture comprising furfural, methyl formate, and cyclopentane; distilling said bottoms product in a separate distillation step so as to recover an overhead fraction comprising methyl formate and cyclopentane; and contacting said last named overhead fraction with furfural so as to recover cyclopentane.

6. The method of resolving a hydrocarbon mixture comprising cyclopentane and neohexane which comprises distilling said mixture in the presence of methyl formate which is introduced to the distillation column near the bottom of said column and in the presence of furfural which is substantially saturated with methyl formate and which is introduced to the distillation column near the top of said column; withdrawing as the overhead product of said distillation a mixture comprising neohexane and methyl formate substantially free from cyclopentane; separating said overhead product into its components by contacting same with furfural and recovering substantially pure neohexane; withdrawing as the bottoms product from said distillation a mixture comprising furfural, methyl formate, and cyclopentane; distilling said bottoms product in a separate distillation step so as to recover an overhead fraction comprising methyl formate and cyclopentane; and contacting said last named overhead fraction with furfural so as to recover cyclopentane.

JAMES H. BOYD.

REFERENCES CITED

The following references are of record in the file of this patent:

UNITED STATES PATENTS

| Number | Name | Date |
| --- | --- | --- |
| 2,290,636 | Deanesly | July 21, 1942 |
| 2,367,701 | Tooke | Jan. 23, 1945 |
| 2,368,050 | Tooke | Jan. 23, 1945 |
| 2,376,104 | Welling | May 15, 1945 |
| 2,406,695 | Lake | Aug. 27, 1946 |
| 2,415,192 | Rittenhouse | Feb. 4, 1947 |
| 2,426,821 | Evans | Sept. 2, 1947 |
| 2,498,928 | Ray et al. | Feb. 28, 1950 |

OTHER REFERENCES

Mair et al., Journal of Research of the National Bureau of Standards, vol. 27, pages 39–63 (July 1941).

Griswold et al., "Pure Hydrocarbons From Petroleum," 38, Industrial and Engineering Chemistry, 65–70 (January 1946).